Jan. 5, 1943.   W. J. HUGHES   2,307,273
BALANCED VALVE
Filed Aug. 24, 1940   3 Sheets-Sheet 1

INVENTOR.
Walter J. Hughes

Jan. 5, 1943.   W. J. HUGHES   2,307,273
BALANCED VALVE
Filed Aug. 24, 1940   3 Sheets-Sheet 2

INVENTOR.
Walter J. Hughes

Jan. 5, 1943.   W. J. HUGHES   2,307,273
BALANCED VALVE
Filed Aug. 24, 1940   3 Sheets-Sheet 3

INVENTOR.
Walter J. Hughes

Patented Jan. 5, 1943

2,307,273

UNITED STATES PATENT OFFICE 2,307,273

BALANCED VALVE

Walter J. Hughes, Chicago, Ill., assignor to Infilco Incorporated, a corporation of Delaware Application August 24, 1940, Serial No. 354,063

11 Claims. (Cl. 251—18)

This invention relates to balanced valves, particularly for controlling the rate of a liquid flow such as that discharged from a sand filter in a municipal water purification plant.

In order to provide uniformity in a flow rate which tends towards irregularity, it is well known in general to interpose a flow restricting member or valve on the flow line and to vary the flow restricting effect thereof so as to compensate for the irregularity mentioned. Such added restrictors are known as control valves. The position of their movable parts and the flow restricting or compensatory effect thereof is commonly controlled from a testing apparatus or actuator which is adapted to ascertain or measure the irregular influences to be offset and to respond to the same.

Obviously it is desirable to have such control valves so constructed as to provide prompt and sensitive control of the flow therethrough. Difficulty has been found in providing a proper balance between sensitivity, power output, and simplicity or economy of actuator construction, in connection with the construction of control valves. Generally if the response to flow irregularities is prompt and fine, then the power available for shifting the valve is insufficient unless a complicated and expensive system of relays or pilots is used. Accordingly, to control flow, control valves must be susceptible of operation by small forces or impulses, especially if they are of the so-called direct acting type, without relays or pilots interposed between the actuator and valve. Control valves should be free from undue or variable friction or resistances to the actuator force or impulse.

If a control valve shall comply with the requirements stated the valve must also be balanced. A valve is balanced mechanically if the movable parts thereof, in all operative positions of the valve and of the valve parts, are in stable or neutral equilibrium so that gravity may not shift their position; and a valve is hydraulically balanced if liquid pressure, impact and other forces inherent in any liquid flow occurring in operation of the valve may not shift any part of the valve from or to any position thereof.

A primary object my invention is to provide a valve which is well balanced mechanically and hydraulically and free from objectionable friction and excessive variations thereof.

Another object is to provide a valve having movable flow obstructing gates journaled in antifriction, thrust absorbing bearings, the distance and leverage between the area of flow obstruction and the thrust bearings being as small as possible.

Another object is to provide a valve having more than two rigid, movable flow obstructing gates journaled in thrust bearings, a set of four such members being preferred.

Another object is to provide a valve which is balanced mechanically and hydraulically throughout a considerable range of flow rates and valve positionings, starting with a very small valve opening which provides maximum compensation and pressure killoff.

Another object is to provide an iris type valve which concentrates the bulk of the flow in an approximately conical body extending along the centerline of the tube on which the valve is interposed.

Another object is to provide a gate valve the open area of which varies substantially in direct proportion to the movement of the part which controls the position of the valve gates.

Still another object is to provide a balanced control valve which is simple, efficient, light by weight and compact in design.

These as well as other objects, features and advantages of my invention will be obvious upon consideration of the following description in connection with the drawings appended, wherein Fig. 1 is a sectional elevation of a preferred embodiment of my invention, the section being taken along line 1—1 of Fig. 2.

Figure 1:
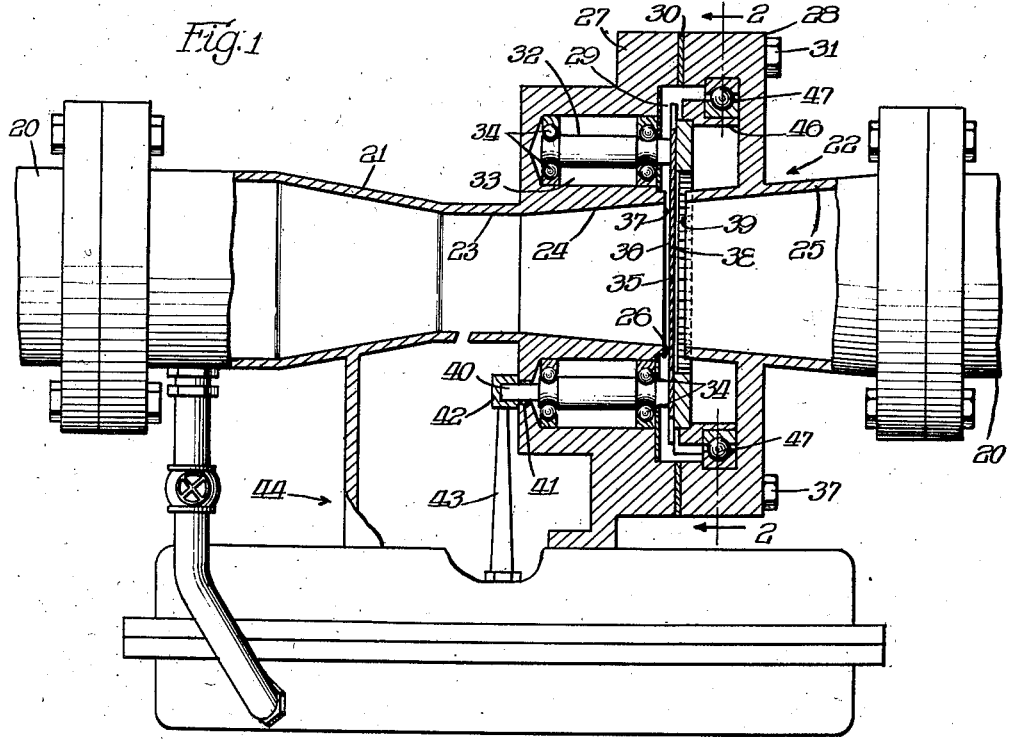
Figure 2:
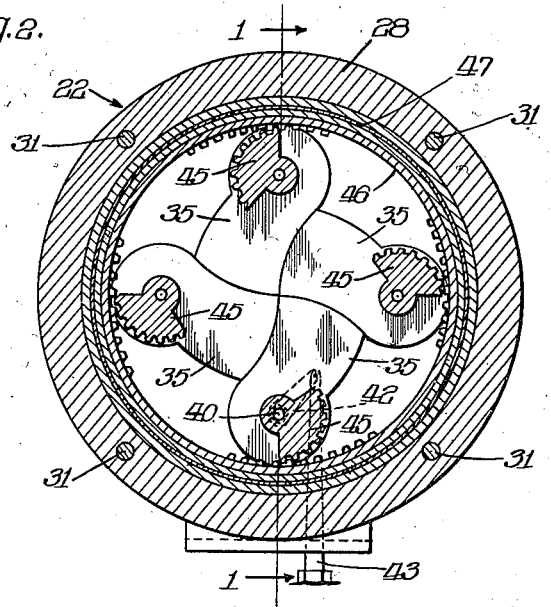
Fig. 2 is another sectional elevation of the embodiment shown in Fig. 1, the section being taken along line 2—2 of Fig. 1.

Referring first to Figs. 1 and 2, the cast iron pipe or conduit 20 has Venturi tube 21 inserted therein and forming a part thereof. A control valve generally designated by numeral 22 is interposed on pipe 20 desirably close behind the throat 23 of venturi 21 from which the valve 22 is to be controlled. For this purpose the wall of conduit 20 adjacent valve 22 is made in two longitudinally spaced sections 24 and 25 of circular cross-section which are separated by a continuous annular gap 26, said gap being located between and confined by planes normal to the axis of conduit 20 at the place of separation. In normal operation the liquid flow is from section 24 to section 25. The two sections 24 and 25 are held in relation spaced by gap 26 by means of annular flanges 27 and 28 integrally formed with sections 24 and 25 respectively. The said flanges are recessed to enclose and confine a continuous annular space or valve housing 29 which surrounds conduit 20 and communicates therewith through gap 26. Gasket 30 may be interposed between flanges 27 and 28 to seal the recess or valve housing 29 from the outside. Bolts 31 serve to accurately center the flanges and sections with respect to one another and to hold the flanges together.

Figure 3:
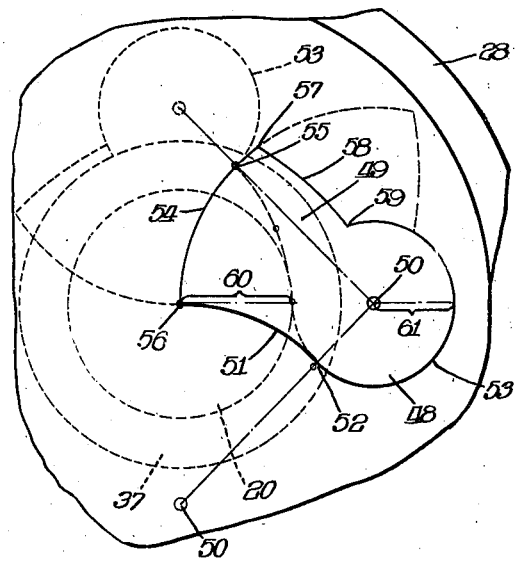
Fig. 3 is a diagram showing in detail the shape and location of certain parts of the embodiment shown in Fig. 2.

The movable member of valve 22 comprises four steel shafts 32, installed outside conduit 20 and extending parallel to the axis of the conduit, from points near the plane of gap 26 towards throat 23. The shafts are journaled in pockets 33 of annular recess 29 by thrust bearings 34, the pockets being located at a distance from the central axis of the conduit equal to the radius of the conduit plus that radius divided by the square root of two (as shown in Figure 3) and separated from the adjoining shaft by an arc of ninety degrees. The pockets are formed in the flange 27 connected to the upstream conduit section 24 and thus the bearings 34 are entirely installed in said upstream structure so that the bearings and shafts may be permanently and conveniently centered, with respect to one another and to conduit 20.

Each valve shaft 32 has rigidly secured thereto a thin and rigid valve gate or leaf 35 made from steel or the like. The four valve leaves are of such insignificant thickness throughout as may be allowable for necessary stiffness, so that the area thereof exposed to pressure in direction which may tend to rotate the gates may be as small as possible. The four valve leaves are kept in a common plane by proper positioning or adjustment of bearings 34, said plane being parallel with and located between those confining gap 26 so that a more restricted annular gap 36 is formed between the front edge 37 of upstream conduit section 24 and the upstream side of leaves 35, and another annular and restricted gap 38 is formed by the front edge 39 of downstream section 25 and the downstream side of leaves 35. The width of the upstream gap 36 can be closely controlled by proper positioning of bearings 34. Preferably the gap 36 between the edge 37 and the upstream side of the valve leaves should be as small as possible and still avoid actual contact between the leaves and the edge, while the annular gap between the edge 39 of the downstream section of the conduit and the back of the valve blades may be of any desirable width as small clearance is not essential.

The several valve shafts 32 terminate within the pockets 33 of annular recess 29 except for one shaft 32 which is shown in the lower portions of Figs. 1 and 2 and which has a stub 40 extending through a packing gland 41 in the wall of flange 27 adjacent the respective pocket 33. This stub 40 carries a crank 42 controlled from Venturi tube 21 through link 43 of actuator 44. Rotation of the stub 40 by link 43 through crank 42 results in rotation of the lowermost valve leaf 35. This valve leaf has a toothed segment 45 rigidly secured thereto and centered around its pivot. Segment 45 engages the inwardly projecting teeth of a large gear 46 which is centered around conduit 20 and rotatably and non-slidably supported in flanged recess 29 by ball bearing 47. The large gear 46 engages a segment 45 attached to each of the remaining valve leaves 35 so that rotation of stub 40 by actuator 44 results in simultaneous and similar rotation of each of the identically shaped valve leaves 35 in the manner suggested by Figs. 5, 6 and 7.

Each valve leaf 35 as shown in Fig. 3 comprises a circular seal portion 48 and an irregularly shaped gate portion 49, said portions of each leaf being formed integrally with one another. The axis of valve shaft 32 passes vertically through the center 50 of the seal 48 secured thereto so that gate 49 when installed can be inserted in and withdrawn from conduit 20 through gap 36, operating in a plane vertical to the conduit at the gap. Each gate 49 has a concave edge 51 tangentially extending from a point 52 upon the periphery 53 of the respective seal 48 and forming a circular arc of 45° around the center 50 of the next adjoining valve leaf. Furthermore each gate 49 has a convex edge 54 which is practically tangent on the adjacent seal edge 53 at point 55 and forms an arc of at least 45° extending outwardly from the end point 56 of the concave edge 51 of the respective gate at right angles therewith to its own terminal point 57. Finally each gate 49 has an edge 58 extending from point 57 to a point 59 upon the circular edge 53 of the seal 48 thereof along any suitable curve approximately parallel to the concave edge 51 of the respective gate. In order to provide such formation and location of the valve leaves, there must be four valve leaves and the seal peripheries 53 must be spaced from the center line of conduit 20 by a distance 60 equaling the radius 61 of the seals 48 multiplied by the square root of 2, the distance 60 likewise being the radius of the inner surface of the upstream section 24, as will be readily understood on an analysis of Fig. 3. As also shown in Fig. 3, the inner edge of the upstream front 37 is a circle of radius 60, and gates 49 in closed position of the valve may extend slightly beyond the outer edge of front 37, but the outer edge of front 37 should be located outside the points 55 at which the gates 49 contact the seals 48. For the sake of brevity the point 55 is spoken of as a point of contact between the arcuate outer edge 54 of gate 49 and the periphery 53 of the seal portion 48 of the adjoining valve leaf. It should be understood, however, that actual contact is not desired as that would cause friction between the respective leaves. Actually, it is preferred that a minute clearance, such as one one-thousandth of an inch, be maintained between the arcuate edge 54 and the periphery 53.

Figure 5:
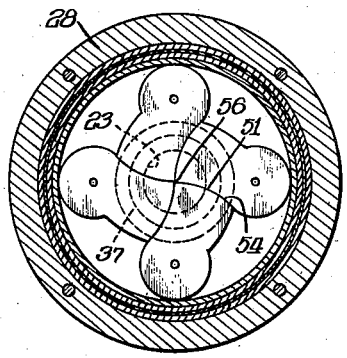
Figs. 5, 6 and 7 are diagrams showing respectively the closed, half-open and fully opened positions of the valve.

In the closed position of the valve as shown in Fig. 5 the four points 56 practically coincide in the center of conduit 20 and the convex edge 54 of each gate contacts the concave edge 51 of the next adjoining gate. In the half open position of Fig. 6 the several gates have been rotated and the pointed portions thereof between edges 51 and 54 of each gate adjacent corner 56 of the gate have moved apart from one another; but contact is being maintained between the convex edge 54 of each gate and the edge 53 of the next adjoining seal at a point geometrically identical with the former point of contact 55. Thus the opening 62 formed by removing the gates from one another is confined by a practically unbroken edge comprising portions of the convex edges and seal edges and all of the concave edges. In the fully opened position of Fig. 7 the convex edges are almost entirely withdrawn from the enlarged opening 62.

Figure 6:
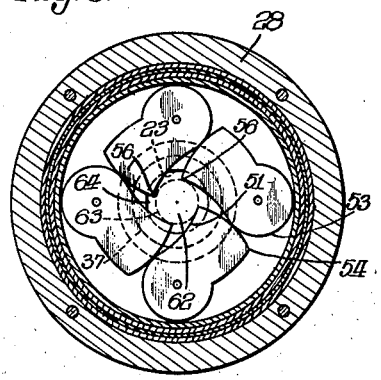
Figure 7:
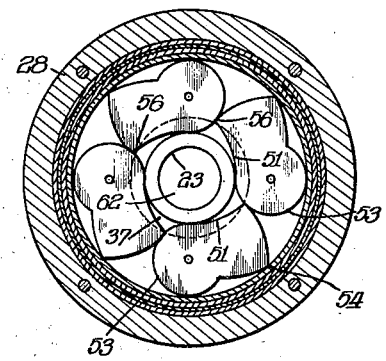
Figure 8:
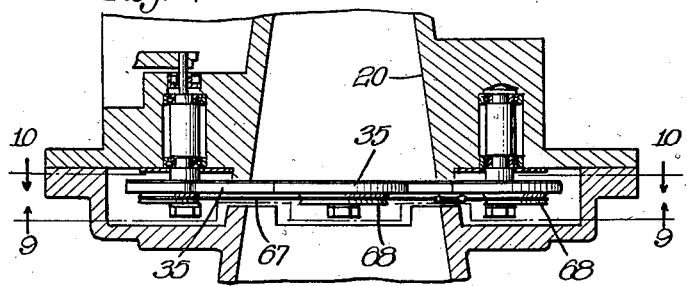
Fig. 8 is a partial sectional view of a modified embodiment, the section being taken along lines 8—8 of Fig. 9.

The gate opening 62 is always an eight-cornered, star shaped one having a central portion shown as circle 63 in Fig. 6 and also having four curved portions 64 radiating from said central portion. The curved portions 64 are tapered towards the geometrical contact points 55 between the seals and gates and are cut short by the fronts 37 and 39 of the conduit sections 24 and 25 extending across the same. Thus, the flow through the valve is largely concentrated towards the center of conduit 20 in the approximate form of a four-winged cone extending along the centerline. Such a centralized flow is very advantageous. If the flow is from valve 22 to throat 23, as may be desirable in certain cases, the effect and accuracy of Venturi tube 21 is distinctly greater with such a relatively centralized flow than otherwise. If the flow is in the other direction, as generally assumed, the same thing is still true and a marked improvement of valve control is had, at least where the valve is located desirably close to the throat of the Venturi tube.

In order to avoid friction between adjacent surfaces of the valve leaves it is preferred that the convex edge 54 have a minute clearance, such as one one-thousandth of an inch, from the periphery of the adjacent seal portion 48 and that the clearance be uniformly sustained in all positions of the valve leaves. If frictional losses were not important an actual contact at point 55 could be possible. In either event the gate opening 62 is confined by a practically continuous solid and rigid edge. Consideration of Fig. 3 will show that the length of this edge becomes smaller when opening 62 becomes larger and vice versa, and thus the edge can be called a contractible and expandible one.

The effective valve opening for a partially opened position, as mentioned before, is made smaller than the gate opening 62, there being interposed upon the radial parts 64 of the gate opening 62, portions of the annular edges 37, 39 of conduit sections 24 and 25 as most clearly shown in Fig. 6. While the edges of the conduit sections are so interposed the seals 48 are still necessary or at least very useful. A certain flow of water can always, even in closed position of the valve, penetrate into the annular recess 29 through the upstream gap 36. The downstream gap 38 is preferably larger and water may unobstructedly return from annular recess 29 to conduit 20 through this downstream gap. The rate of flow of water which latterally penetrates into and through space 29 from conduit 20 depends in large part on the area and form of gap 36. By virtue of seals 48 contacting gates 49 at geometrical point 55 the area and form of gap 36 is substantially the same regardless whether the valve may be closed, half-open or fully opened. Thus the total flow through valve 22 consists in the sum of a radial flow through a gap 36 of constant area and the flow through the valve opening proper, the area of which valve opening is controlled by rotation of the valve shaft 32 carrying stub 40.

Figure 4:
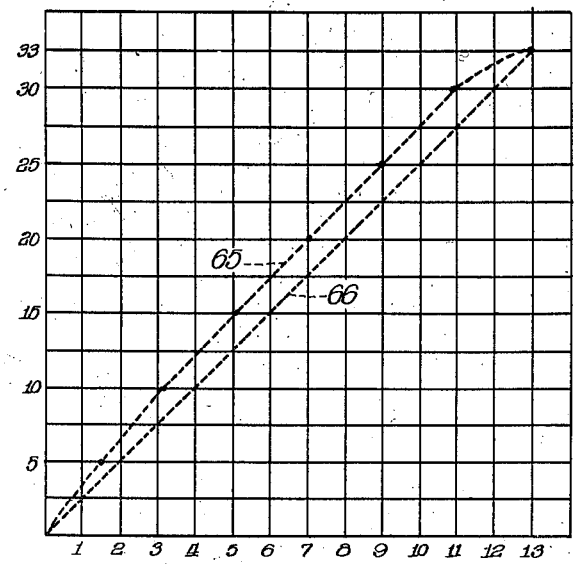
Fig. 4 is a graphical chart of certain operative features of the apparatus.

Further geometrical analysis of Fig. 3 shows that rotation of the valve gates results in a variation of the valve area which is almost directly proportional to the rotation of the valve shafts. The difference between the effective opening and true proportionality is due mainly to the fact (as shown in Figure 6) that the outer tips of the curved portions 64 lie outside of the inner edge 37 of the conduit wall and are, therefore, of no practical importance for the passage of liquid through the valve. The ordinates entered in the graphical chart of Fig. 4 are angles by which crank 42 and gate 49 may be turned from the fully closed position thereof. The abscissas represent areas of the valve opening corresponding to such turning movements. The width of edge 37 assumed in ascertaining the values of Fig. 4 was such that the several valve leaves could be turned approximately 40° from the fully closed position of Fig. 5 and that upon such rotation the corners 56 of the valve gates were between the inner and outer limits of edge 37. The actual relationship of turning movements and valve areas in a valve constructed in such manner is plotted as curve 65, direct proportionality being visualized for comparison by the straight line 66. It will be seen that the areas are almost exactly proportional to the turning movements, at least over a substantial range of valve openings.

Every readjustment of the valve by any unit increment of pressure differential acting upon actuator 44 is effected against a valve resistance of slight and practically uniform magnitude. The only appreciable friction in my valve prevails in thrust bearing 34 if a minute clearance of perhaps 1/1000 in. is left at the geometrical seal point 55. The amount of friction to be absorbed in bearings 34 depends on the thrust taken up by the valve leaves and the leverage to the valve shaft. The maximum distance between the thrust absorbing bearing 34 adjacent seal 48 and any points of the flow obstructing gate 49 is only about 1.7 times the full diameter of valve 22, due to inherent geometrical features of the four leaf construction as described. Thus the transmission or leverage of thrust is greatly reduced, aside from the further advantage of compact valve construction. Of course, the thrust taken up, or valve killoff pressure prevailing, varies during the operation of the valve. Thus the valve will theoretically work somewhat more smoothly or readily when the loss of head through a filter bed in the system is high than when it is low. However, such difference in operation is negligible and at any rate it is much smaller than in valves known to the art.

The modification of Figs. 8 to 13 shows the valve leaves 35 interconnected by a cable 67 running over segmental sheaves 68 on leaves 35 this being in effect a gear train such as that shown at 45, 46 of Figs. 1 and 2 but having an infinite number of teeth and thus providing more reliable transmission of actuator movement when the cable is made from proper material.

The construction is also modified in that the valve leaves 35 are reinforced by massive hubs 69 and ribs 70 which, of course, must be formed and installed so that they may be located in positions exposing no lateral area thereof to any appreciable pressure differential. For this purpose the said ribs are located on the downstream side of leaves 35 and the edges thereof are sufficiently spaced from the edges of leaves 35 so that all lateral surfaces of the ribs, located in conduit 20 or recess 29, may be exposed to a practically uniform recovery pressure.

Figure 10:
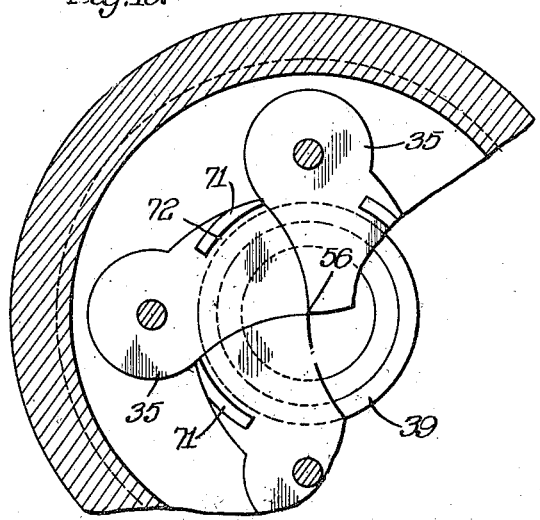
Fig. 10 is still another partial sectional view of the embodiment of Fig. 8, the section being taken along lines 10—10 of Fig. 8.
Figure 14:
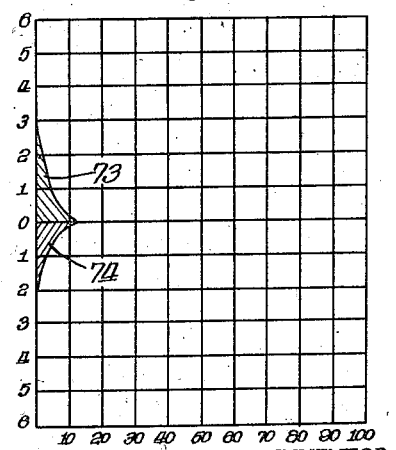
Fig. 14 is a graphical chart of certain operative features of the modified apparatus.

Finally I have shown baffles or strips 71 having inner edges 72 in form of circular arcs around the points 56 and being attached to the upstream side of valve leaves 35 outside the edges 37, 39 of conduit sections 24, 25 and closely spaced therefrom as most clearly shown in Fig. 10. When the valve is opened to expose a small percentage of the total valve area then a certain arcuate part of the radial flow which outwardly passes through gap 36 is deflected backwardly by the strips 71, striking the same and thereby tending to compensate for the appreciable inward differential or slamming tendency which prevails in such position due to the vena contracta or wire drawing effect which can be observed in such position of any valve. I have found that by providing a baffle strip of proper length I can produce a practically perfect balance of the valve, hydraulically, even at the smallest valve opening required in practice. My pertinent findings are graphically shown in Fig. 14, wherein the positive ordinates are values of unbalanced forces due to wire-drawing effects; the negative ordinates are values of the reaction of radial flows striking the baffle strips; and the abscissas are areas of valve opening, in percents. It will be noted that the reaction 73 produced by the baffle strips in effect counterbalances the unbalancing forces 74.

Figure 11:
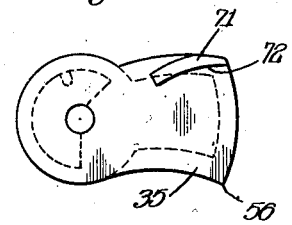
Fig. 11 shows a detail of the embodiment of Fig. 8, the view being taken in the same direction in which the view of Fig. 10 is taken.
Figure 9:
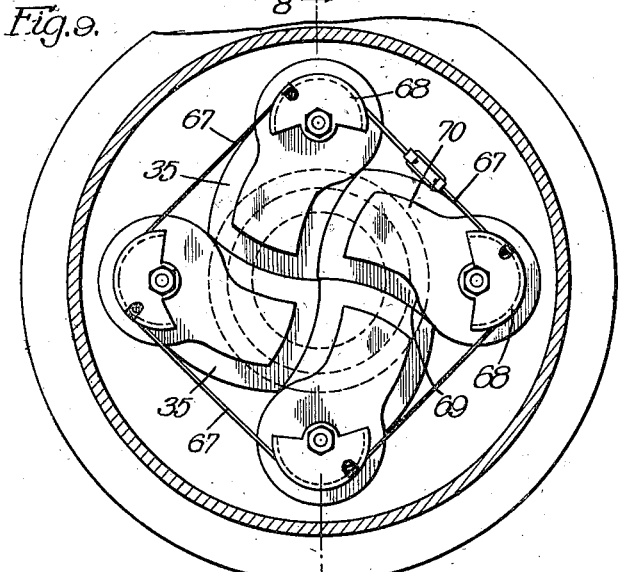
Fig. 9 is another sectional view of the embodiment of Fig. 8, the section being taken along lines 9—9 of Fig. 8.
Figure 12:
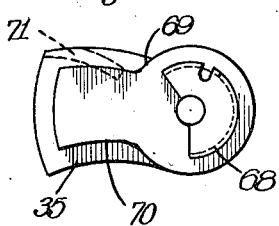
Fig. 12 shows the same detail, the view being taken in the direction in which the view of Fig. 9 is taken.
Figure 13:
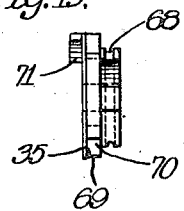
Fig. 13 shows the same detail, the view being taken in the direction in which the view of Fig. 8 is taken.

The several valve leaves and attachments thereof as illustrated by Figs. 11, 12, 13, etc., are identical in form and construction and thus can be made economically and accurately. The valve as described has all the advantages of a true gate valve but is free from the frictional resistance, irregularity of valve opening and other disadvantages of gate valves heretofore known and thereby lends itself more readily to use as a control valve especially of the direct acting type.

Various modifications can be applied, all of which are intended to be covered by the following claims.

I claim:

1. A four-gate iris type valve comprising a circular chamber, a conduit extending through said chamber adjacent the center thereof, four rotatable, hydraulically balanced gates installed in said chamber located in common planes, equally spaced from one another and from the center of said conduit and adapted to be interposed in said conduit or to be withdrawn therefrom, a gap between the upstream face of said gates and the adjacent end of the conduit, a deflecting baffle on the upstream face of at least one of said gates so located as to lie across said gap when the gates are fully interposed into said conduit, a rotatable shaft rigidly fixed to each of said gates perpendicular to the plane of said gates, means for rotating said shafts in unison, and a bearing for each of said shafts in said circular chamber.

2. Apparatus as described in claim 1 wherein the means for rotating the said four shafts in unison comprises an arcuate rack rigidly attached to each shaft, and a rotatable circular arcuate rack in mesh with each of said arcuate racks secured to the shafts.

3. Apparatus as described in claim 1 wherein the means for rotating the said shafts in unison comprises a sheave, rigidly attached to each shaft, and a cable interconnecting said several sheaves.

4. Apparatus as described in claim 1 wherein each of said gates is secured to the respective shaft by a circular seal formed integrally with the gate, the radius of said seals being equal to the radius of said conduit divided by the square root of two and the peripheries of said seals being spaced from the center of said conduit by a distance substantially equalling the radius of the conduit.

5. Apparatus as described in claim 1 wherein said chamber is rigidly secured to an actuator housing, the actuator comprising a reciprocable member in said housing, one of said shafts extending into said housing and carrying a crank, and said reciprocable member engaging said crank.

6. A flow control valve comprising a conduit of a radius R; a chamber around said conduit and connected therewith by an annular communication; four rotatable shafts substantially parallel to the axis of the conduit journaled in said chamber at equal distances from each other and a distance from the axis of the conduit equal to $$R \text{ plus } \frac{R}{\sqrt{2}}$$

means for rotating said shafts in unison; a valve leaf rigidly attached to each shaft, such leaves comprising a circular seal portion of a radius substantially equal to $$\frac{R}{\sqrt{2}}$$

described about the center of the shaft and a thin gate portion formed integral with said seal portion, one edge of which gate portion constitutes an arc tangential to said seal of substantially 45° measured from the point of tangency and described about a center at a distance from the center of said seal equal to $$R + 2\frac{R}{\sqrt{2}}$$

the second edge of which gate portion is an arc described about the center of the seal with a radius equal to $$R + \frac{R}{\sqrt{2}}$$

said arc measuring substantially 45° measured from the point of intersection of said first edge and away from the concavity of said first edge and a third edge connecting said second edge to said seal and constituting an arc of substantially the same length and curvature as said first edge, said leaves being rotatable in identical planes in said annular communication to meet in edge to edge relationship across said conduit when in a closed position, and to lie in said annular communication when in an open position, a gap between the upstream face of said valve leaves and the adjacent end of said conduit, and an arcuate baffle on the upstream face of the valve leaves located on said leaves so as to lie substantially concentric to, and outside of, the wall of the conduit when the valve leaves are fully interposed into said conduit.

7. In a flow control valve of the iris type comprising a conduit, an annular recess about said conduit, a plurality of leaves pivoted in said recess, and means for rotating said leaves in unison, the improvement which comprises providing a relatively small gap between the upstream face of the valve leaves and the adjacent edge of the conduit and providing the valve leaves with an impingement baffle on the upstream side of said leaves and so located as to be adjacent to, and outside of, the wall of the conduit when the valve leaves are in a closed position.

8. A flow control valve comprising a conduit, a chamber around said conduit and connected therewith by an annular communication; a plurality of rotatable shafts substantially parallel to the axis of the conduit journaled at fixed points in said chamber and equally spaced one from another and from the axis of the conduit, means for rotating the shafts in unison, a valve leaf rigidly attached to each shaft and so arranged as to rotate in common planes in said annular communication to meet in edge to edge relationship across said conduit when in a closed position and to provide a small gap between the upstream side of said leaves and the adjacent wall of said communication, said leaves being relatively thin and of uniform size and shape and provided with an arcuate baffle on the upstream face thereof so located as to lie concentric to, and outside of, the wall of the conduit when the valve leaves are fully interposed into said conduit.

9. A valve leaf for a hydraulically balanced iris type valve comprising a thin, substantially circular seal with a radius equal to the radius of the conduit with which said valve is associated divided by the square root of two; a thin gate portion formed integral with said seal portion, one edge of which gate portion constitutes an arc of substantially 45 degrees tangential to said seal, measured from the point of tangency, described about a center at a distance from the center of said seal equal to the radius of said conduit plus two times said radius divided by the square root of two, another edge of which gate portion is an arc of substantially 45 degrees, described about the center of said seal, measured from the point of intersection with said first edge and away from the concave side of said first edge, with a radius equal to the radius of said conduit plus said radius divided by the square root of two, and a third edge connecting said second side to said seal, constituting an arc of substantially the same length and curvature of said first edge; and a reinforcing rib located on the downstream side of each valve leaf and removed from the edges thereof.

10. A valve leaf for a hydraulically balanced iris type of valve comprising a thin, substantially circular seal with a radius equal to the radius of the conduit with which said valve is associated divided by the square root of two; a thin gate portion formed integral with said seal portion, one edge of which gate portion constitutes an arc of substantially 45 degrees tangential to said seal, measured from the point of tangency, described about a center at a distance from the center of said seal equal to the radius of said conduit plus two times said radius divided by the square root of two, another edge of which gate portion is an arc of substantially 45 degrees, described about the center of said seal, measured from the point of intersection with said first edge and away from the concave side of said first edge, with a radius equal to the radius of said conduit plus said radius divided by the square root of two; and a third edge connecting said second side to said seal, constituting an arc of substantially the same length and curvature of said first edge; and an arcuate baffle on the upstream face of the valve leaf located on said leaf so as to lie concentric to, and outside of, the wall of the conduit when the valve leaf is fully interposed in said conduit.

11. In a flow control valve of the iris type comprising a conduit, an annular recess about said conduit, a plurality of thin leaves pivoted in said recess and means for rotating said leaves in unison, the improvement which comprises reinforcing the thin leaves by a reinforcing rib on the downstream side of each valve leaf and removed from the edges thereof.

WALTER J. HUGHES.

CERTIFICATE OF CORRECTION.

Patent No. 2,307,273.                                    January 5, 1943.

WALTER J. HUGHES.

It is hereby certified that error appears in the printed specification of the above numbered patent requiring correction as follows: Page 1, first column, line 48, after the word "object" insert --of--; page 3, first column, line 74, for "latterally" read --laterally--; page 4, second column, line 1, strike out "arcuate" first occurrence; and that the said Letters Patent should be read with this correction therein that the same may conform to the record of the case in the Patent Office.

Signed and sealed this 9th day of March, A. D. 1943.

Henry Van Arsdale,
Acting Commissioner of Patents.

(Seal)